US 6,549,566 B1

(12) United States Patent
Lee et al.

(10) Patent No.: US 6,549,566 B1
(45) Date of Patent: Apr. 15, 2003

(54) BANDWIDTH REDUCED MULTI CARRIER WIRELESS TRANSCEIVER AND METHOD THEREOF

(75) Inventors: Chan Goo Lee, Daejon-Shi (KR); Hae Won Chung, Daejon-Shi (KR); Jong Ho Kim, Daejon-Shi (KR); Myoung Seob Lim, Chunju-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 0 days.

(21) Appl. No.: 09/409,257

(22) Filed: Sep. 30, 1999

(30) Foreign Application Priority Data

Oct. 1, 1998 (KR) ......................................... 1998-41361

(51) Int. Cl.$^7$ .............................. H04B 1/38; H04L 5/16
(52) U.S. Cl. ........................ 375/219; 375/260; 370/203; 370/210
(58) Field of Search ................................. 375/219, 220, 375/222, 240, 260; 370/203, 210, 302

(56) References Cited

U.S. PATENT DOCUMENTS

| 5,282,222 A | | 1/1994 | Fattouche et al. ............. 375/1 |
| 5,406,551 A | | 4/1995 | Saito et al. .................... 370/19 |
| 5,608,764 A | * | 3/1997 | Sugital et al. ............... 375/344 |
| 5,757,766 A | * | 5/1998 | Sugita ......................... 370/206 |
| 5,771,224 A | | 6/1998 | Seki et al. ................... 370/206 |
| 5,822,323 A | * | 10/1998 | Kaneko et al. .............. 370/480 |
| 6,091,702 A | * | 7/2000 | Saiki ........................... 370/203 |

OTHER PUBLICATIONS

"Data Transmission by Frequency–Division Multiplexing Using the Discrete Fourier Transform", by S. B. Weinstein et al, IEEE Transactions on Communication Technology, vol. com–19, No. 5, Oct. 1971, pp. 625, 629–633.

"A Study of Novel OFDM Transmission Schemes for Use in Indoor Environments" by Rorie O'Neill et al, pp. 909–913, (0–7803–3157–5/96) ©1996 IEEE.

* cited by examiner

*Primary Examiner*—Mohammad H. Ghayour
(74) *Attorney, Agent, or Firm*—Antonelli, Terry, Stout, & Kraus, LLP

(57) ABSTRACT

The present invention relates to a high efficiency Multi Carrier wireless transceiver and a method thereof. The object of the present invention is to provide the high efficiency wireless transceiver and a method thereof which reduces the transmission bandwidth to one half of required bandwidth in the wireless transceiver system using the Multi Carrier Code Division Multiple Access method. The present invention particularly relates to a wireless transceiving system using the Multi Carrier modulation method among high speed radio transmission technique, and has an effect of doubling the transmission efficiency in a system using a wired or wireless transmission channel by reducing the transmission bandwidth to one half of required bandwidth by using the symmetry of a Discrete Fourier Transformed signal. The present invention is used in the Multi Carrier wireless transceiver.

10 Claims, 5 Drawing Sheets

BANDWIDTH REDUCED MULTI CARRIER WIRELESS TRANSCEIVER AND METHOD THEREOF

BACKGROUND OF THE INVENTION

1. Field of the Invention

The present invention relates to a wireless transceiver system using Multi Carrier modulation and, in particular, to a Multi Carrier transceiver which can reduce a transmission bandwidth to one half of required bandwidth by using a symmetry of discrete Fourier transformed signal and a method thereof.

2. Information Disclosure Statement

In general, a high speed wireless transmission mainly uses a Direct-Sequence Spectrum Spread Method, a frequency hopping method or a Multi Carrier transmission method.

Figure 1:
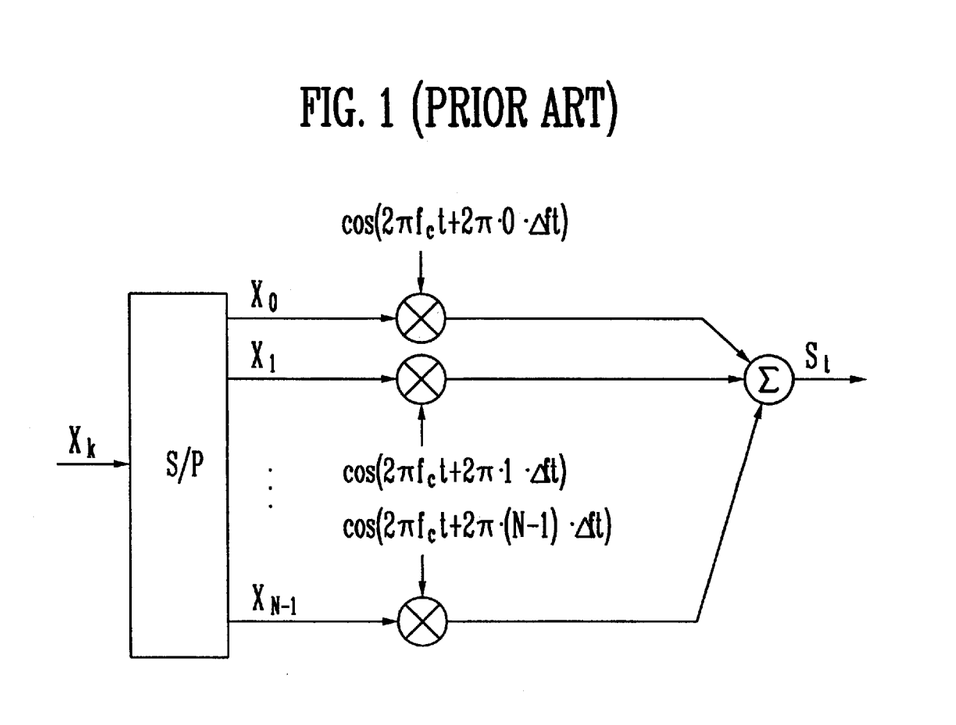
FIG. 1 is a basic structure of a prior art transmitter using the Multi Carrier modulation method.
Figure 2:
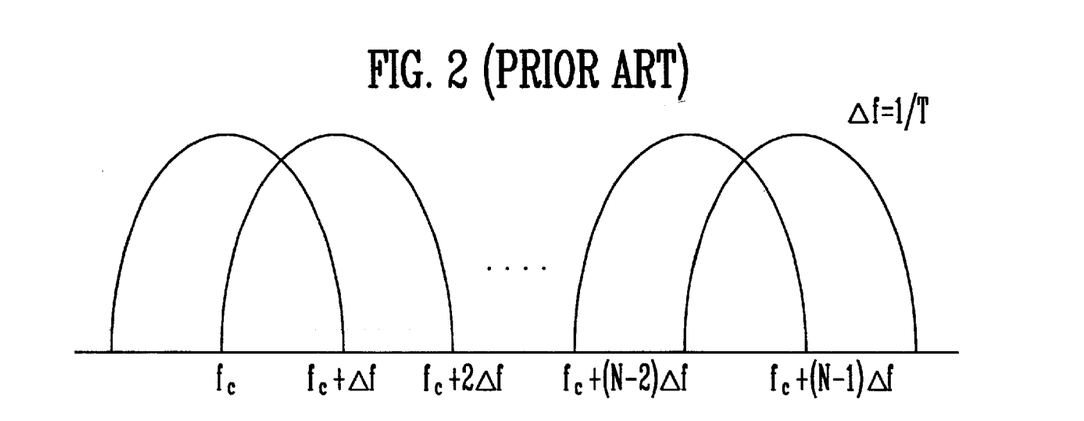
FIG. 2 is a spectrum diagram of the prior art Multi Carrier modulation method.

With reference to FIGS. 1 and 2, a basic concept of multi carrier modulation method used in the multi carrier transmission method is described.

FIG. 1 illustrates a basic transmission structure of the multi carrier modulation method having N subcarriers.

The basic concept of the multi carrier modulation method is to transmit by dividing an available frequency into several subchannels. These subchannels orthogonally overlap each other.

When a symbol interval is taken as T, the interval $\Delta f$ between the subcarriers which can assure the orthogonality is a multiple of k/T (k is an integer).

FIG. 2 shows a signal spectrum of multi carrier modulation method.

The system of FIGS. 1 and 2 can be analyzed by an equation 1.

$$s(t) = \sum_{k=0}^{n-1} X_k \cos(2\pi f_c t + 2\pi k \Delta f t) \quad \text{[Equation 1]}$$

$$= \sum_{k=0}^{N-1} X_k \cos 2\pi f_c t \cos 2\pi \frac{k}{T} t - \sum_{k=0}^{N-1} X_k \sin 2\pi f_c t \sin 2\pi \frac{k}{T} t$$

$$= m_I(t) \cos 2\pi f_c t - m_q(t) \sin 2\pi f_c t$$

$$m_I(t) = \sum_{k=0}^{N-1} X_k \cos 2\pi \frac{k}{T} t$$

$$m_q(t) = \sum_{k=0}^{N-1} X_k \sin 2\pi \frac{k}{T} t$$

In equation 1, it can be known that s(t) is in form obtained by modulating baseband signals $m_I(t)$ and $m_q(t)$ with a frequency fc. Defining t=nT/N in the baseband signals $m_I(t)$ and $m_q(t)$, a discrete signal form of the base band signals is obtained.

$$m_I(n) = \sum_{k=0}^{N-1} X_k \cos 2\pi \frac{nk}{N} \quad \text{[Equation 2]}$$

$$m_q(n) = \sum_{k=0}^{N-1} X_k \sin 2\pi \frac{nk}{N}$$

It can be seen that the equation 2 is a same representation as an N point Inverse Discrete Fourier Transform (IDFT) with the exception of a scaling factor 1/N and j of imaginary term. Therefore, the baseband signal can be implemented by carrying out the IDFT of a symbol to be transmitted, and the same result can be obtained by dividing the result of IDFT into real terms and imaginary terms, transforming the discrete signal into a continuous signal, modulating the result with the frequency fc and carrying out a sum operation thereof. At this time, it should be noted the (–) sign must be put in sum operation of imaginary parts. The Discrete Fourier Transform (DFT) block can be further fast calculated by using a fast Fourier transform (FFT) digital signal processor (DSP). A construction of a Multi Carrier wireless transceiver of Orthogonal Frequency Division Multiplexing (OFDM) method based on the FFT is shown in FIG. 3.

Figure 3:
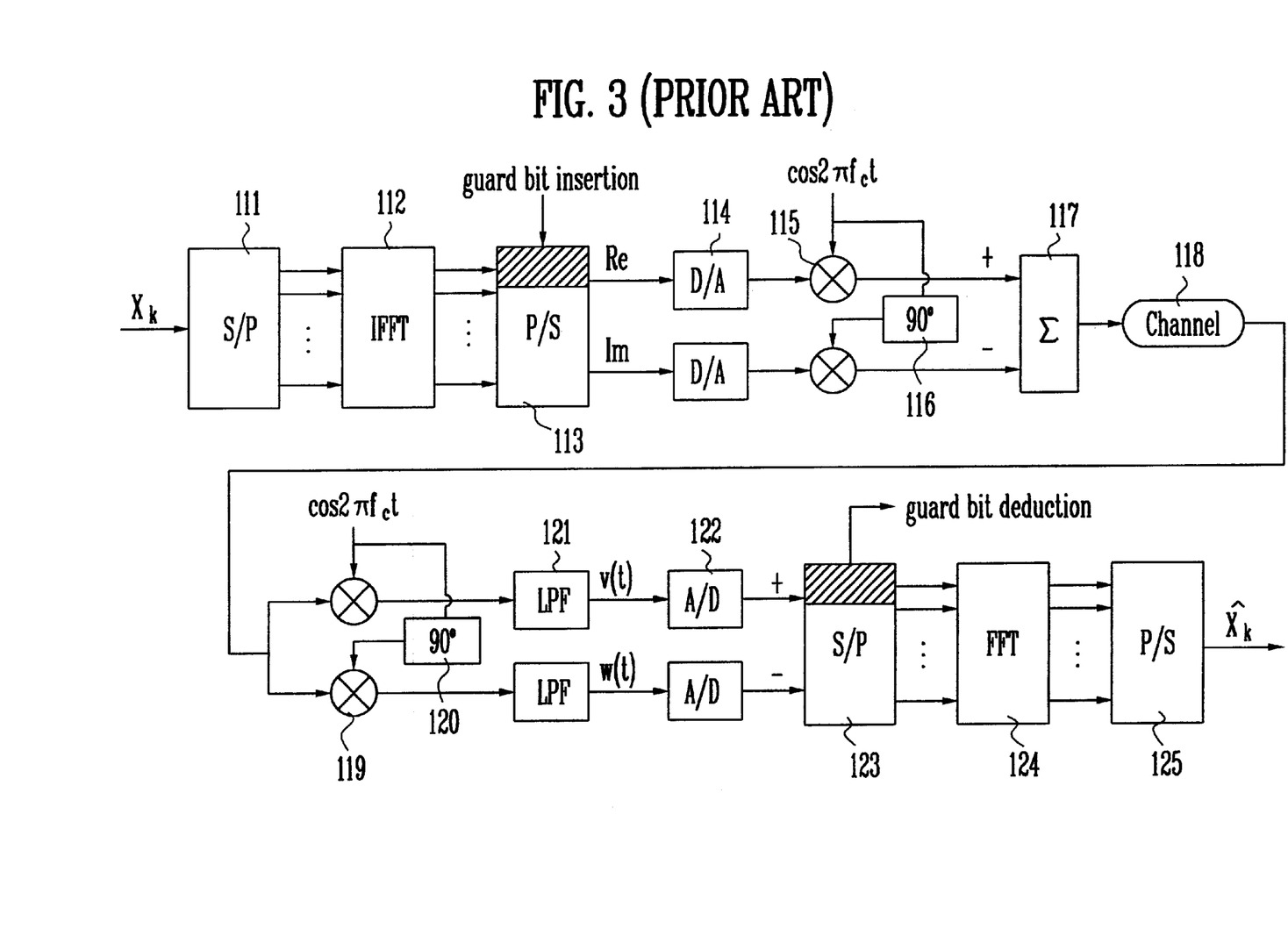
FIG. 3 is a block diagram of a conventional Multi Carrier wireless transceiver.

FIG. 3 is an illustrative construction drawing of a conventional Multi Carrier wireless transceiver which comprises a serial/parallel (S/P) conversion section 111, an Inverse Fast Fourier transformation section (IFFT) 112, a parallel/serial (P/S) transformation section 113, a digital/analog (D/A) conversion section 114, a modulation section 115, a phase shift section 116, a synthesizing section 117, a transceiving channel 118, a demodulation section 119, a phase shift section 120, a low pass filter 121, an analog/digital (A/D) conversion section 122, a serial/parallel conversion section 123, a Fast Fourier Transformation section (FFT) 124 and a parallel/serial conversion section 125.

A description of operation of the conventional Multi Carrier wireless transceiver having a structure described above is given below.

The serial/parallel conversion section 111 converts the transmission data into N low speed parallel binary data and transmits the converted data to the IFFT section 112.

The IFFT section 112 inverse Fourier transforms the input data by taking the input data as frequency domain spectrum components and transmits to the parallel/serial conversion section 113 an output composed of a real part data sequence and an imaginary part data sequence.

The parallel/serial conversion section 113 divides the Inverse Fourier transformed parallel data into a real part and imaginary part, inserts a guard bit for preventing an adjacent signal interference in a transmitting channel, converts the parallel data into a serial data sequence and transmits it to the digital/analog conversion section 114. At this time, the output is divided into a real part (Re) data and imaginary part (Im) data. The digital/analog conversion section 114 converts an input Multi-level digital signal into analog signal and transmits the converted signal to the modulation section 115. The modulation section 115 multiplies the input analog signals with a carrier of cos $2\pi f_c t$ and a carrier obtained by shifting the phase of the former carrier by 90 degree by the phase shift section 116, respectively. The synthesizing section 117 inverts the sign of the imaginary part signal from the modulation section 115, adds the imaginary part signal to the real part signal, and transmits the added signal through the channel 118.

The demodulation section 119 divides the received signal from the channel 118, restores the divided signals to signals same as the output signals from the digital/analog conversion section 114 by multiplying the divided signals with a signal of cos $2\pi f_c t$ having same frequency and phase as the carrier and a signal obtained by shifting the phase by 90 degree by the phase shift section 120, respectively, and transmits them to low pass filters 121. The low pass filters 121 only passes low frequency band among the demodulated signals, and the analog/digital conversion section 122 converts the analog signal transmitted from the low pass filters 121 into digital and transmits it to the serial/parallel conversion section 123.

The serial/parallel conversion section 123 converts the input real part signal and inverted imaginary part signal into N low speed parallel binary data, removes the guard bit and transmits the data to the FFT section 124. The FFT section 124 discrete Fourier transforms the input discrete parallel data and transmits the data to the parallel/serial conversion section 125, and the parallel/serial conversion section 125 converts the Fourier transformed parallel data into serial data stream.

Figure 4:
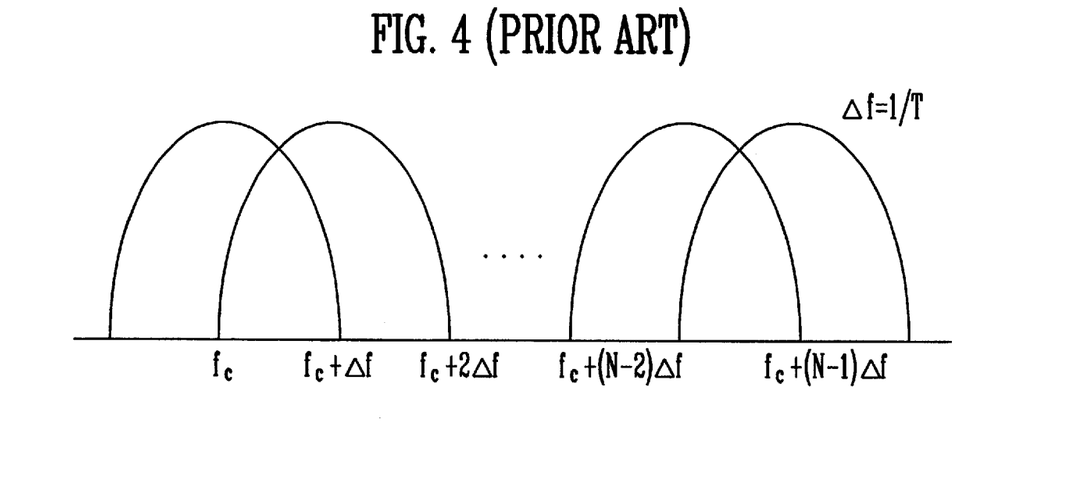
FIG. 4 is a spectrum diagram of the conventional Multi Carrier wireless transceiver.

FIG. 4 is a wireless channel frequency spectrum diagram in which the signal transmitted from the conventional Multi Carrier wireless transceiver is presented in a frequency spectrum at the channel.

As shown in FIG. 4, the conventional Multi Carrier wireless transceiver occupies a bandwidth of $(N+1)\Delta f$, where the $\Delta f$ is the carrier interval.

As shown in FIG. 4, in case of using the conventional Multi Carrier wireless transceiver, since the occupied bandwidth at the wireless or wired channel is large, there are problems that degrades transmission efficiency and is vulnerable to multi-path fading, noise and interference.

SUMMARY OF THE INVENTION

An object of the present invention invented to solve the problems described above is to provide a Multi Carrier wireless transceiver and a method thereof which can reduce the transmission bandwidth to one half of required bandwidth by using the symmetry of the discrete Fourier transformed signal in a wireless transceiver system.

A reduced bandwidth Multi Carrier wireless transceiver of the present invention to accomplish the object described above comprises: a first serial/parallel conversion means for converting externally input serial signals into parallel signals; an Inverse Fast Fourier Transform (IFFT) means for Inverse Fourier Transforming the plurality of parallel signals transmitted from the first serial/parallel conversion means, dividing the signals into data sequences of real part and imaginary part, and outputting the signals by reducing the number of channels; a transmission processing means for converting the output signal of the IFFT means into analog signal and transmitting a modulated signal; a reception processing means for demodulating the signal transmitted from the transmission processing means and thereafter converting the demodulated signal into digital signal; a high frequency signal generation means for receiving the output signal of the reception processing means and recovering the high frequency signal; and a signal recovery means for receiving the output signal of the high frequency signal generation means and outputting the original serial data.

A reduced bandwidth Multi Carrier wireless transceiving method which can reduce transmission bandwidth to a half of required bandwidth by using the symmetry of Inverse Fourier Transformed signal comprises the steps of: a first step in which a serial/parallel conversion section converts externally input serial signals into parallel signals; a second step in which an Inverse Fast Fourier Transform (IFFT) section Inverse Fourier Transforms the plurality of parallel signals transmitted from the first serial/parallel conversion means, divides the signals into data sequences of real part and imaginary part, and outputs the signals by reducing the number of high frequency channels; a third step in which a transmission processing section converts the output signal of the IFFT section into analog signal and transmits the signal by modulating the signal; a fourth step in which a reception processing section demodulates the signal transmitted from the transmission processing means and thereafter converts the demodulated signal into digital signal; a fifth step in which a high frequency signal generation section receives the output signal of the reception processing means and generates the high frequency signal; and a sixth step in which a signal recovery section receives the output signal of the high frequency signal generation means and outputs the original serial data.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF THE INVENTION

A prefered embodiment of the present invention will be explained in detail below with reference to the accompanying drawings.

Figure 5:
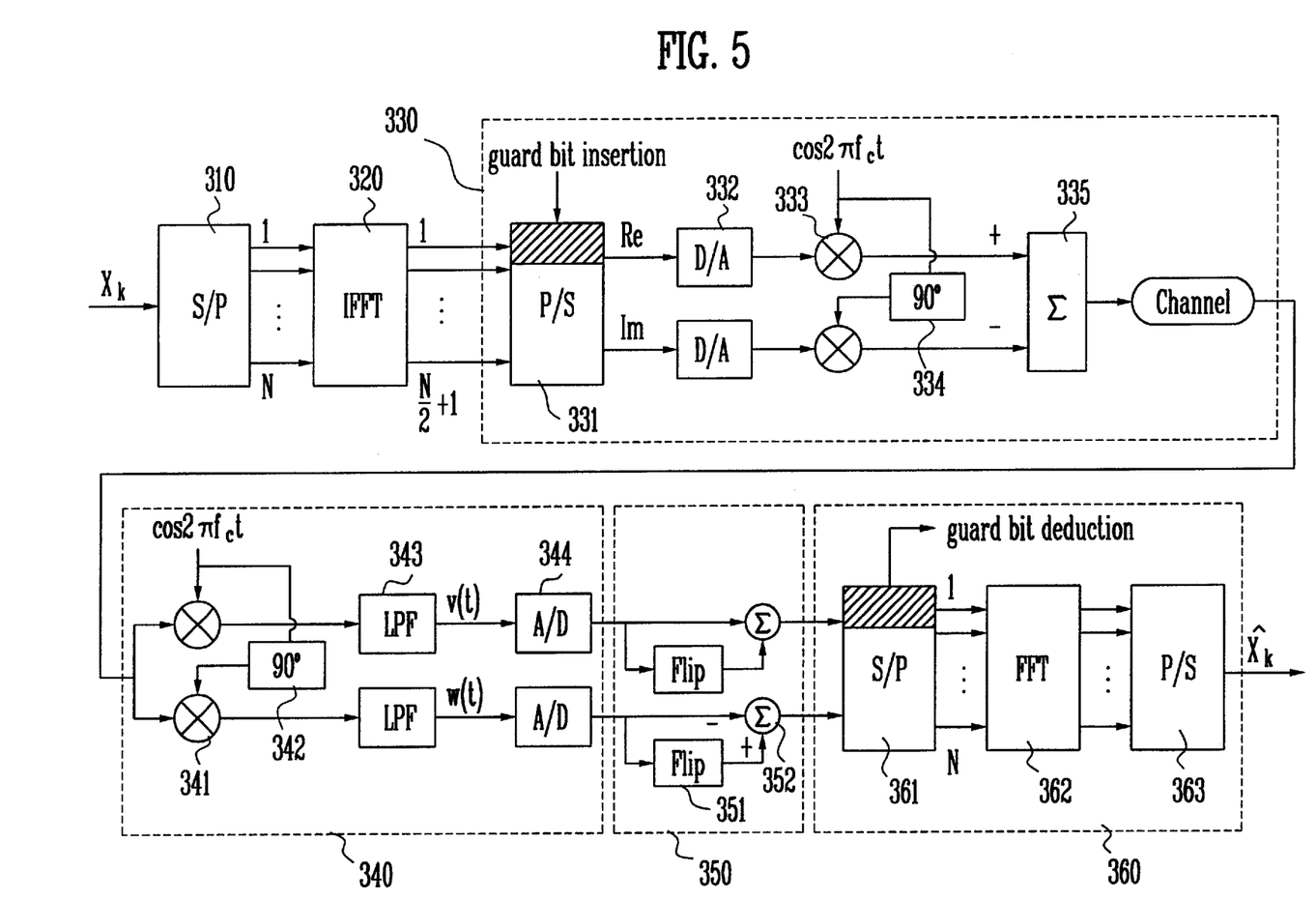
FIG. 5 is a block diagram of one embodiment of a reduced bandwidth Multi Carrier wireless transceiver of the present invention.

FIG. 5 is a block diagram of one embodiment of a reduced bandwidth Multi Carrier wireless transceiver of the present invention.

As shown in FIG. 5, the reduced bandwidth Multi Carrier wireless transceiver according to an embodiment of the present invention comprises a serial/parallel conversion section 310 for converting transmission data into low speed N parallel binary data, an Inverse Fast Fourier Transformation section (IFFT) 320 for providing (n/2)+1 outputs by taking the input data as frequency domain spectrum component, a transmission processing section 330 for transmitting the inverse Fourier transformed data, a reception processing section 340 for receiving the transmitted signal, a high frequency signal generator 350 for recovering high frequency band signals from the received signals, and a signal recovery section 360 for serial/parallel converting the entire signal, performing the discrete Fourier transform, and thereafter for generating N serial data stream.

The transmission processing section 330 comprises a converter 331 for dividing the parallel data transmitted from the IFFT section 320 into a real part and imaginary part, inserting a guard bit for preventing an adjacent signal interference in a transmitting channel and for converting the data into a serial data sequence, a digital/analog converter 332 for converting the input Multi-level digital signal into analog signal, a modulator 333 for multiplying the carrier cos 2π f$_c$t to the input analog signal, a phase shifter 334 for shifting the phase of the carrier by 90 degree, and a synthesizer 335 for synthesizing the two modulated signals into one output signal by converting the sign of the imaginary part signal and by adding the imaginary part to the real part signal.

The reception processing section 340 comprises a demodulator 341 for dividing the input signal and for restoring the divided signals to signals same as the signals of the output of the digital/analog converter 332 by multiplying the divided signals with a demodulation signal cos 2π f$_c$t having same frequency and phase as the carrier, a phase shifter 342 for shifting the phase of the demodulation signal by 90 degree, a low pass filter 343 and an analog/digital converter 344.

The high frequency signal generator 350 comprises a duplicator 351 for duplicating the high frequency signal component from (N/2)+1 to N−1 channels corresponding to the high frequency component from the received digital signal, and a synthesizer 352 for summing the duplicated signal component and the original signal.

The signal recovery section 360 comprises a serial/parallel converter 361 for converting the input real part signal and the inverted imaginary part signal into low speed N parallel binary data a FFT 362 for discrete Fourier transforming the input discrete parallel data, and a parallel/serial converter 363 for converting the Fourier transformed parallel data into serial data stream.

The operation of the reduced bandwidth Multi Carrier wireless transceiver according to the present invention is described in detail below with reference to FIGS. 5 and 7.

Figure 7:
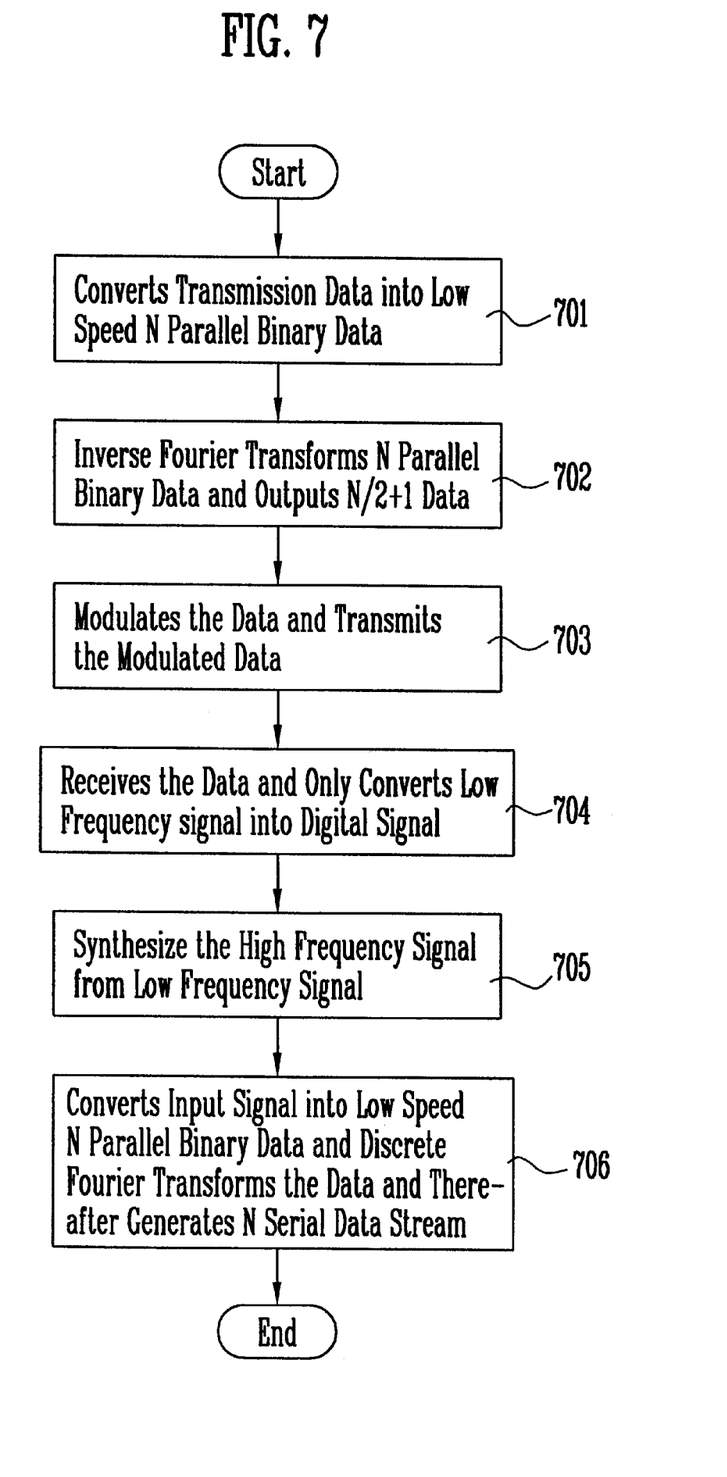
FIG. 7 is flow diagram showing a performing process of a reduced bandwidth Multi Carrier wireless transceiving method.

FIG. 7 is a flow diagram showing a performing process of a reduced bandwidth Multi Carrier wireless transceiving method.

The serial/parallel conversion section 310 converts a wide bandwidth signal sequence Xk into low speed N parallel binary data having period of T and transmits the converted data to the IFFT section 320 at step 701.

The IFFT section 320 performs a N point Discrete Fourier Inverse Transformation for the input N data and provides (N/2)+1 data stream to the transmission processing section 330 by using the symmetry of the Discrete Fourier Transformed signal at step 702.

The signal transmitted to the transmission processing section 330 is converted into serial Multi-level signal by being divided into a real part and an imaginary part at the parallel/serial converter 331 and the signal is inserted with guard bits for preventing the adjacent signal interference at the channel and is output. The output signal is transmitted to the modulator 333 by being converted to analog signal at digital/analog converter 332. The modulator 333 modulates the input analog signals of real part and imaginary part by multiplying the signals with the carrier cos 2π f$_c$t and the carrier obtained by shifting the phase of the former carrier by 90 degree by the phase shifter 334. The synthesizer 335 inverts the sign of imaginary part signal modulated at the modulator and adds the inverted imaginary part to the modulated real part signal to make one output signal and transmits the signal through the channel at step 703.

The demodulator 341 of the reception processing section 340 restores the real part and imaginary part signals output from the transmission processing section 330 into signals same as the output signals of the digital/analog converter 332 by multiplying the real part and imaginary part signals with a signal cos 2π f$_c$t having the same frequency and phase as the carrier and a signal obtained by shifting the phase of the signal cos 2π f$_c$t by the phase shifter 342, and transmits the restored signal to the low pass filter 343. The low pass filter 343 only passes the low frequency band among the signals output from the demodulator 341. The analog/digital converter 344 converts the analog signal transmitted from the low pass filter 343 into digital signal and transmits the digital signal to the high frequency signal generator 350 at step 704.

The duplicator 351 of the high frequency signal generator 350 duplicates (N/2)−1 high frequency band data, which was not transmitted, by copying the digital signal received from analog/digital converter 344 of the reception processing section 340. The synthesizer 352 sums the signal component duplicated by the duplicator 351 and the original signal, and at this time, in the imaginary part, sums the duplicated signal and the original signal with the sign inverted at step 705. The signal summed by the synthesizer 352 is transmitted to the signal recovery section 360.

The serial/parallel converter 361 of the signal recovery section converts the input real part and inverted imaginary part signals into low speed N parallel binary data, removes the guard bits and transmits the converted signal to the FFT 362. The FFT 362 N point Discrete Fourier Transforms the input N discrete parallel data sequence and transmits the result to the parallel/serial converter 363. The parallel/serial converter 363 converts the Fourier transformed parallel data into serial data stream at step 706. This signal, that is, the stream becomes the original user data X$_k$.

Figure 6:
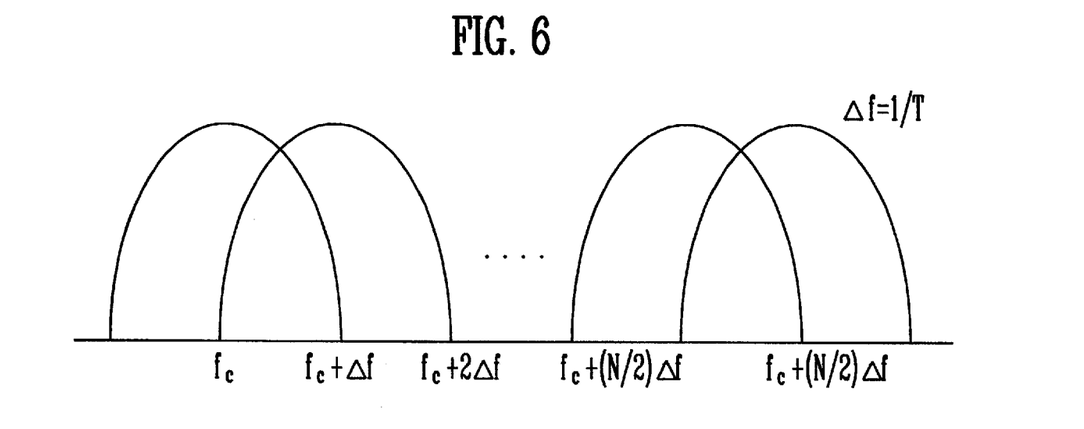
FIG. 6 is a spectrum diagram of a wireless channel frequency of the reduced bandwidth Multi Carrier wireless transceiver of the present invention.

FIG. 6 shows a spectrum on the channel for the transmitted signal using the present invention. As a conclusion, the transmission efficiency is almost doubled in view of that the conventional method required N+1 subchannels, however, the present invention only occupies (N/2)+1 subchannels.

On the other hand, the theory of the present invention is described below in detail.

Since the IFFT section 320 generates the Orthogonal Frequency Division Multiplexing (OFDM) symbols, a method is invented for reducing the bandwidth by using the property of Discrete Fourier Transforms. Substituting the m$_i$(n) and M$_q$(n) of equation 1 and equation 2 with n values gives the following equation 3.

[Equation 3]
$$m_I(0) = \sum_{k=0}^{N-1} X_k$$

$$m_I(1) = \sum_{k=0}^{N-1} X_k \cos 2\pi \frac{k}{N}$$

$$m_I(2) = \sum_{k=0}^{N-1} X_k \cos 2\pi \frac{2k}{N}$$

...

$$m_I(N-2) = \sum_{k=0}^{N-1} X_k \cos 2\pi \left(k - \frac{2k}{N}\right) = m_I(2)$$

$$m_I(N-1) = \sum_{k=0}^{N-1} X_k \cos 2\pi \left(k - \frac{k}{N}\right) = m_I(1)$$

$$m_q(0) = 0$$

$$m_q(1) = \sum_{k=0}^{N-1} X_k \sin 2\pi \frac{k}{N}$$

-continued $$m_q(2) = \sum_{k=0}^{N-1} X_k \sin 2\pi \frac{2k}{N}$$

...

$$m_q(N-2) = \sum_{k=0}^{N-1} X_k \sin 2\pi \left(k - \frac{2k}{N}\right) = -m_q(2)$$

$$m_q(N-1) = \sum_{k=0}^{N-1} X_k \sin 2\pi \left(k - \frac{k}{N}\right) = -m_q(1)$$

In the Inverse Discrete Fourier Transformed signal waveform as described above, the real term is formed from (N/2)+1th carrier by an even function symmetry, and the imaginary term is formed from (N/2)+1th carrier by an odd function symmetry. Therefore, instead of sending N subcarriers, only (N/2)+1 subcarriers are sent and the remaining subcarriers can be duplicated at the reception stage. In this way, only the bandwidth of ((N/2)+2)Δf is required instead of the entire bandwidth (N+1)Δf. For example, when N is 8, the occupied bandwidth is 9Δf. In the present invention, in this case, since only (N/2)+1 subcarriers are used instead of N subcarriers, the occupied bandwidth is 6Δf. The transmission stage transmits the signal having the spectrum shown in FIG. 6, and the reception stage duplicates the (N/2)−1 data after analog/digital conversion thereof the make left-right symmetry and adds the duplicated data to the original data, so that the original transmission data are recovered.

Therefore, the present invention effectuates the satisfactory transceiving with only the transmission bandwidth equivalent to the half of conventionally required transmission bandwidth.

The present invention described above can efficiently use the transmission bandwidth in the transceiver system using a limited transmission bandwidth, and has an effect of doubling the usage efficiency and the transmission efficiency of wireless frequency resources in a system using a wired or wireless transmission channel by reducing the transmission bandwidth to one half thereof by using the symmetry of DFT.

What is claimed is:

1. A reduced bandwidth Multi Carrier transceiver using the symmetry of Inverse Fourier Transformed signal comprising:

a first serial/parallel conversion means for converting externally input serial signals into parallel signals;

an Inverse Fast Fourier Transform (IFFT) means for Inverse Fourier Transforming the plurality of parallel signals transmitted from said first serial/parallel conversion means, dividing the signals into data sequences of real part and imaginary part, and outputting the signals by reducing the number of channels;

a transmission processing means for converting the output signal of said IFFT means into analog signal and transmitting a modulated signal;

a reception processing means for demodulating the signal transmitted from said transmission processing means and thereafter converting the demodulated signal into digital signal;

a high frequency signal generation means for receiving the output signal of said reception processing means and recovering the high frequency signal; and a signal recovery means for receiving the output signal of said high frequency signal generation means and outputting the original serial data.

2. The transceiver of claim 1, wherein said IFFT means Inverse Fourier Transforms N parallel signals (N is a natural number) output from said first serial/parallel conversion means and deduces (N/2)+1 low frequency domain signals composed of real part and imaginary part.

3. The transceiver of claim 1, wherein said transmission processing means comprises:

a first parallel/serial conversion means for converting the parallel signals output from said IFFT means into serial signals;

a first digital/analog conversion means for converting the digital signals of real part output from said first parallel/serial conversion means into analog signals;

a second digital/analog conversion means for converting the digital signals of imaginary part output from said first parallel/serial conversion means into analog signals;

a first modulation means for modulating the output signal of said first digital/analog conversion means by using externally input predetermined carriers;

a first phase shifting means for shifting the phase of said predetermined carriers;

a second modulation means for modulating the output signal of said second digital/analog conversion means by using carriers having phase shifted by said first phase shift means; and a synthesizing means for synthesizing the output signals of said first and second modulation means.

4. The transceiver of claim 1, wherein said reception processing means comprises:

a first demodulation means for demodulating the signal transmitted from said transmission processing means by using externally input predetermined demodulation signal;

a second phase shift means for shifting the phase of said predetermined demodulation signal;

a second demodulation means for demodulating the signal transmitted from said transmission processing means by using demodulation signals having phase shifted by said second phase shift means;

a first low pass filtering means for passing low frequency band of the signal output from said first demodulation means;

a second low pass filtering means for passing low frequency band of the signal output from said second demodulation means;

a first analog/digital conversion means for converting the analog signal output from said first low pass filtering means into digital signal; and a second analog/digital conversion means for converting the analog signal output from said second low pass filtering means into digital signal.

5. The transceiver of claim 4, wherein said high frequency signal generation means comprises:

a first duplication means for duplicating the signal output from said first analog/digital conversion means;

a second duplication means for duplicating the signal output from said second analog/digital conversion means;

a synthesizing means for synthesizing the signal output from said first analog/digital conversion means and the signal output from said first duplication means; and a another synthesizing means for synthesizing the signal output from said second analog/digital conversion means and the signal output from said second duplication means.

6. The transceiver of claim 5, wherein said signal recovery means comprises:

a second serial/parallel conversion means for converting the serial signals output from said second synthesizing means and third synthesizing means into parallel signals;

a FFT means for Fourier transforming the signal output from said second serial/parallel conversion means; and a second parallel/serial conversion means for converting the parallel signals output from said FFT means into serial signals.

7. A reduced bandwidth Multi Carrier transceiving method using the symmetry of Inverse Fourier Transformed signal comprising the steps of:

a first step in which a serial/parallel conversion section converts externally input serial signals into parallel signals;

a second step in which an Inverse Fast Fourier Transform (IFFT) section Inverse Fourier Transforms the plurality of parallel signals transmitted from said first serial/parallel conversion means, divides the signals into data sequences of real part and imaginary part, and outputs the signals by reducing the number of channels;

a third step in which a transmission processing section converts the output signal of said IFFT section into analog signal and transmits the signal by modulating the signal;

a fourth step in which a reception processing section demodulates the signal transmitted from said transmission processing means and thereafter converts the demodulated signal into digital signal;

a fifth step in which a high frequency signal generation section receives the output signal of said reception processing means and generates the high frequency signal; and a sixth step in which a signal recovery section receives the output signal of said high frequency signal generation means and outputs the original serial data.

8. The method of claim 7, wherein said fifth step comprises:

a seventh step in which a duplicator of said high frequency signal generation section duplicates signal components of $(N/2+1)$ to $(N-1)$ channels equivalent to high frequency components by copying the digital signals received from said reception processing section; and an eighth step in which a synthesizer of said high frequency signal generation section sums the signal duplicated by said duplicator and the original signal.

9. The transceiver of claim 2, wherein said reception processing means comprises:

a first demodulation means for demodulating the signal transmitted from said transmission processing means by using externally input predetermined demodulation signal;

a second phase shift means for shifting the phase of said predetermined demodulation signal;

a second demodulation means for demodulating the signal transmitted from said transmission processing means by using demodulation signals having phase shifted by said second phase shift means;

a first low pass filtering means for passing low frequency band of the signal output from said first demodulation means;

a second low pass filtering means for passing low frequency band of the signal output from said second demodulation means;

a first analog/digital conversion means for converting the analog signal output from said first low pass filtering means into digital signal; and a second analog/digital conversion means for converting the analog signal output from said second low pass filtering means into digital signal.

10. The transceiver of claim 3, wherein said reception processing means comprises:

a first demodulation means for demodulating the signal transmitted from said transmission processing means by using externally input predetermined demodulation signal;

a second phase shift means for shifting the phase of said predetermined demodulation signal;

a second demodulation means for demodulating the signal transmitted from said transmission processing means by using demodulation signals having phase shifted by said second phase shift means;

a first low pass filtering means for passing low frequency band of the signal output from said first demodulation means;

a second low pass filtering means for passing low frequency band of the signal output from said second demodulation means;

a first analog/digital conversion means for converting the analog signal output from said first low pass filtering means into digital signal; and a second analog/digital conversion means for converting the analog signal output from said second low pass filtering means into digital signal.

* * * * *